(12) United States Patent
Alhazmy

(10) Patent No.: US 8,277,614 B2
(45) Date of Patent: Oct. 2, 2012

(54) MULTI-STAGE FLASH DESALINATION PLANT WITH FEED COOLER

(75) Inventor: Majed Moalla Alhazmy, Jeddah (SA)

(73) Assignee: King Abdulaziz University, Jeddah (SA)

( * ) Notice: Subject to any disclaimer, the term of this patent is extended or adjusted under 35 U.S.C. 154(b) by 911 days.

(21) Appl. No.: 12/285,129

(22) Filed: Sep. 29, 2008

(65) Prior Publication Data

US 2010/0078306 A1 Apr. 1, 2010

(51) Int. Cl.
*B01D 3/06* (2006.01)
*C02F 1/06* (2006.01)

(52) U.S. Cl. ........ 202/173; 62/238.5; 12/451 S; 12/442; 159/2.3; 159/DIG. 8; 159/DIG. 23; 202/176; 203/11; 203/71; 203/88

(58) Field of Classification Search ............ 159/2.3, 159/DIG. 8, DIG. 23; 202/173, 176; 203/10, 203/11, 71, 88, DIG. 4; 62/238.5; 122/451 S, 122/442, DIG. 4

See application file for complete search history.

(56) References Cited

U.S. PATENT DOCUMENTS

| | | | | |
|---|---|---|---|---|
| 3,489,652 | A | * | 1/1970 | Williamson .................... 203/11 |
| 3,844,899 | A | * | 10/1974 | Sager, Jr. ...................... 202/173 |
| 3,871,968 | A | * | 3/1975 | Wood et al. .................... 202/173 |
| 3,926,739 | A | * | 12/1975 | Izumi ............................ 202/173 |
| 3,948,734 | A | | 4/1976 | Kohl et al. |
| 3,951,752 | A | | 4/1976 | Roller |
| 3,951,753 | A | | 4/1976 | Roler |
| 3,966,562 | A | | 6/1976 | Mukushi et al. |
| 4,016,028 | A | * | 4/1977 | Young et al. .................. 159/48.2 |
| 4,131,538 | A | * | 12/1978 | Rose et al. ...................... 208/352 |
| 4,132,075 | A | * | 1/1979 | Fleck et al. .................. 60/641.5 |
| 4,310,387 | A | | 1/1982 | Sadhukhan |
| 4,349,068 | A | | 9/1982 | Coury |
| 4,363,703 | A | | 12/1982 | ElDifrawi et al. |
| 5,968,312 | A | * | 10/1999 | Sephton ....................... 159/47.1 |
| 6,349,563 | B1 | | 2/2002 | Kinoshita |
| 2004/0026225 | A1 | | 2/2004 | Domen |
| 2005/0115878 | A1 | | 6/2005 | Lai |

FOREIGN PATENT DOCUMENTS

| | | |
|---|---|---|
| GB | 1138780 | 1/1969 |
| GB | 1166149 | 10/1969 |
| GB | 1169263 | 11/1969 |
| GB | 1238976 | 7/1971 |
| GB | 1314469 | 4/1973 |

OTHER PUBLICATIONS

"Ebara seawater pumps for multi-stage flash evaporation"; http://powerservices.lakho.com/node/59; 4 pages; printed on Jul. 29, 2008.

\* cited by examiner

*Primary Examiner* — Virginia Manoharan
(74) *Attorney, Agent, or Firm* — Richard C. Litman

(57) ABSTRACT

The once-through multi-stage flash (MSF) desalination plant with feed cooler is a desalination system utilizing a feed water cooler. Particularly, the plant includes a conventional MSF system, with a separate water cooler for cooling the seawater or brine that is input into the system, prior to the passage of the brine into the condensation conduits and brine heater. In use, the cooled brine is pumped, under pressure, through at least one conduit that passes through a plurality of flash chambers. The brine is then heated and injected into the plurality of flash chambers, where it is flashed into steam. The steam condenses on an external surface of the at least one conduit, and the condensed water is then extracted from the plant.

1 Claim, 1 Drawing Sheet

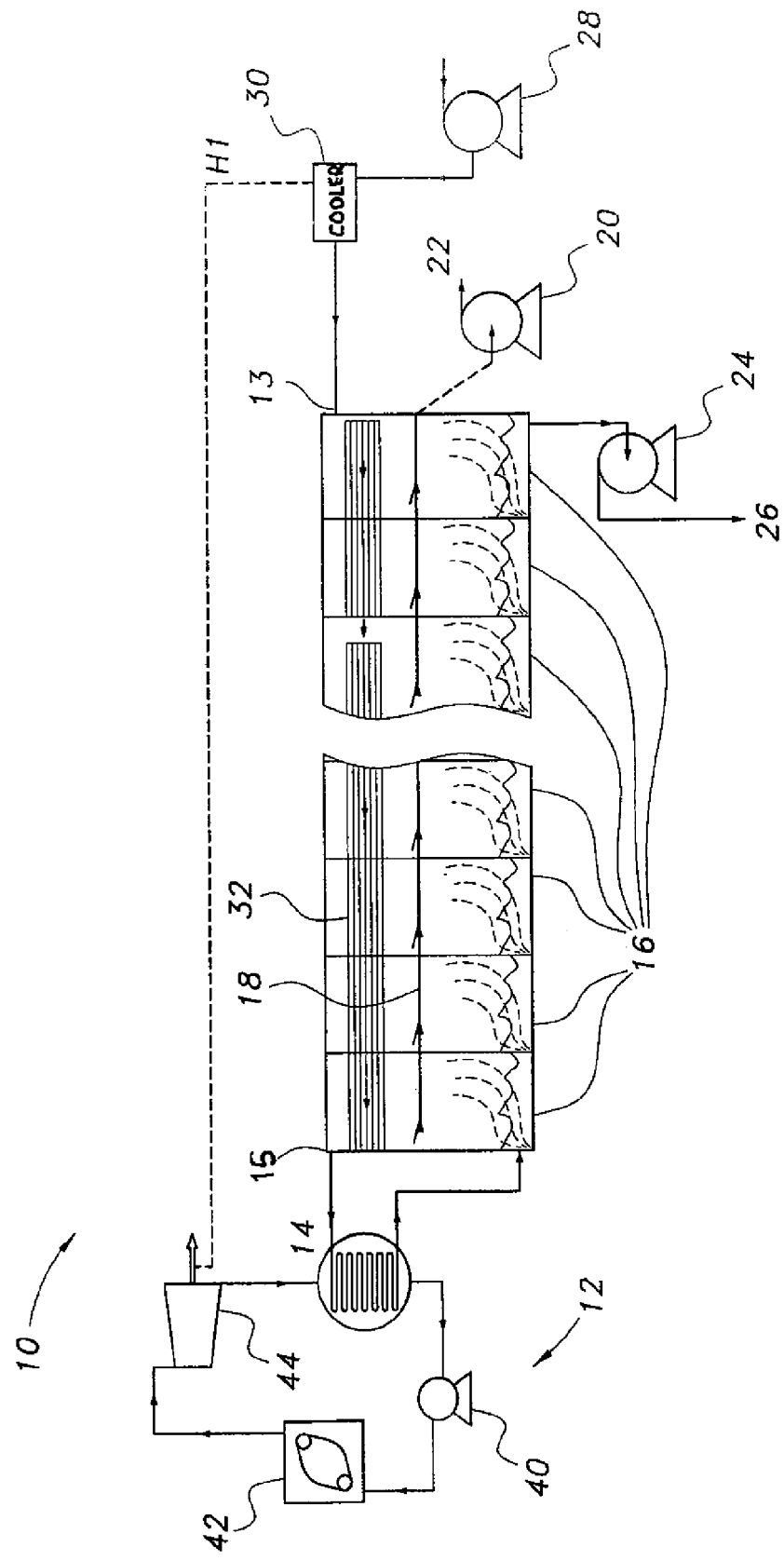

MULTI-STAGE FLASH DESALINATION PLANT WITH FEED COOLER

BACKGROUND OF THE INVENTION

1. Field of the Invention

The present invention relates to desalination plants for producing potable water, and particularly to a once-through multi-stage flash (MSF) desalination.

2. Description of the Related Art

Desalination is a growing industry in many parts of the world. Both countries with vast areas of arid land, as well as countries having more diverse climates are increasingly producing fresh water through desalination to meet the demands of growing populations and rising standards of living.

Several desalinating methods for seawater or brine have been developed, and may mainly be classified into two types. The first type is membrane isolation, such as reverse osmosis filtering or electrodialysis. The reverse osmosis method is suitable for desalinating seawater, and the electric dialysis is suitable for treating brine containing lesser quantities of salt.

The second type is thermal separation. The thermal separation techniques include two main categories: the first is evaporation followed by condensation of the formed water vapor; and the second involves freezing followed by melting of the formed water ice crystals. Evaporation followed by condensation is the most common thermal separation process used in desalination, and in nearly all cases, it is coupled with power generation units. The evaporation process may take place over a heat transfer area and is termed as boiling or within the liquid bulk, and is generally defined as "flashing". The evaporation processes include the multi-stage flash desalination (MSF) process, the multiple effect evaporation (MEE) process, the single effect vapor compression (SEC) process, the humidification-dehumidification (HDH) process, and the use of solar stills. MSF desalination includes several configurations, such as "once-through", brine recirculation and brine mixing.

The simplest once-through flashing process may occur in a single stage and can be described as follows: Feed seawater (i.e., brine) is first heated as liquid (under pressure) in a heater, known as the top brine heater, using steam from an external source. The feed is prevented from boiling by keeping the pressure throughout the top brine heater above the saturation pressure corresponding to its temperature. The brine is then throttled to a flash chamber, with the chamber being generally referred to as a "flashing stage". The pressure in the chamber is lower than that corresponding to the brine temperature leaving the heater. The pressure inside the flashing chamber is maintained by a suitable ejection system. As a result of the throttling process, some vapor will flash off the bulk of the brine. The flashed off vapor is then condensed over the outer surface of a tube bundle, referred to as a "condenser", by heat transfer to a cooling stream flowing inside the tubes. After that, the condensate is collected over collecting trays and withdrawn out of the stage as potable water. The remaining high salinity brine will be withdrawn using a pump, and delivered back to sea. In order to reduce the amount of heating steam needed in the top brine heater, the feed is used as the cooling fluid flowing inside the tubes of the condenser. In this way, the latent heat released from the condensation process of the vapor is utilized in heating the feed (i.e., "regeneration"). Moreover, further performance improvement is achieved by passing the hot high salinity brine to another flashing chamber, or a series of chambers, maintained at lower pressures to form the MSF plant.

The conventional MSF plant consists of a series of stages, where the first stage (the top stage) has the highest temperature, since it is heated by steam from an external source, and is generally referred to as the "top brine heater". The last flashing stage (the bottom stage), on the other hand, has the lowest temperature, since it exchanges heat with the sea, and is generally referred to as the "condenser". The intake seawater is introduced into the inside of the condenser tubes of the last flashing stage. The temperature of the feed water determines the temperature of the last stage. The feed is heated by regeneration in the condenser (feed-water-heater) and externally by heating steam in the brine heater. The flashing brine flows counter to the feed flow from the first to the last flashing stage. The heating steam, with a temperature range of approximately 97° to 117° C., drives the flashing process. The heating steam flows on the outside of the brine heater tubes and the feed stream flows on the inside of the tubes. As the heating steam condenses, the feed stream gains the latent heat of condensation and its temperature reaches the desired top brine temperature. This parameter, together with the flashing temperature in the last stage (controlled by the seawater feed temperature), defines the total evaporation range (also called the "flashing range"). The hot brine enters the first flashing stage, through a throttling obstacle, and then a small amount of product vapor is formed. The flashing process reduces the temperature of the unevaporated brine. The temperature reduction across the flashing stages is associated with a drop in the stage pressure, where the highest stage pressure is found in the first stage after the brine heater, and the lowest pressure is that of the last stage. The pressure drop across the stages allows for brine flow without the use of interstage pumping units. In each stage, the flashed off vapor condenses on the outside surface of the condenser tubes. The condensed vapor collects over the distillate trays across the flashing stages to form the final product water, which is withdrawn from the last flashing stage. The condensation process releases the vapor latent heat, which is used to preheat the feed water. As a result, the seawater temperature increases to a higher value. In a once-through MSF, the brine in the last stage is blow back down to the sea.

Additional units in the desalination plant include pretreatment of the feed and intake seawater streams, such as screening, filtration, deaeration, and addition of antiscalant and foaming inhibitors. Other basic units in the system include pumping units for the feed seawater, and brine blowdown. The amount of fresh water produced from MSF plants depends on the evaporation range (i.e., the span along which evaporation takes place). The evaporation range is defined as the difference between the temperature of the top brine heater and that of the last stage. The top brine temperature of the plant depends on the chemical treatment (scale prevention) and is fixed for the plant. The last stage temperature depends on the feed water temperature. High seawater temperature in the summer reduces the evaporation range. It is common for MSF plants to have two operational modes for summer and winter, respectively, to take into consideration changes in the feed temperature due to seasonal climatic variations. An increase by 10% is reported during winter operation, as compared to summer operation, in some desalination plants in Saudi Arabia.

Adding a cooler to the conventional MSF desalination plant in order to reduce the temperature of feed, hence the temperature of the last stage, provides a means to maintain stable operation of the MSF plant independent of the seasonal climatic variations, and increases the evaporation range, and thus the yield of the plant without exceeding the limits set on the highest top brine temperature. Thus, a multi-stage flash desalination plant with a feed cooler solving the aforementioned problems is desired.

SUMMARY OF THE INVENTION

The multi-stage flash (MSF) desalination plant with feed cooler is a desalination system having a feed water cooler. In particular, the plant includes a conventional MSF system, but has a separate water cooler for cooling the seawater or brine that is input into the system prior to the passage of the brine into the condensation conduits and brine heater. This reduces the temperature of the last stage and increases the flashing range. As a result of this, the yield of the plant is increased, and MSF plant may operate independent of climatic variations.

The once-through MSF plant includes a plurality of flash distillation stages. The two ends of the MSF train are the top brine heater and the bottom feed water heater (referred to as the "plant condenser"), respectively. These two ends are separated by a series of flashing stages. Each of the flash distillation stages includes a flash chamber and a condenser. The condenser includes at least one conduit having an inlet and an outlet, with the at least one conduit passing through the plurality of flash chambers.

Further, a pump is provided for extracting a volume of brine from an external source and feeding the volume of brine under pressure directly to and through the at least one conduit. The pump is in direct fluid communication with the inlet of the at least one conduit. A cooler, such as a refrigeration machine or the like, is further provided and is in communication with the inlet so as to cool the volume of brine prior to direct delivery thereof through the at least one conduit.

A heater is further provided for heating the volume of brine after the volume of brine has been delivered through the at least one conduit, and prior to injection thereof into the first stage. An outlet pump then extracts condensed water from the plant. In use, the heated volume of brine injected into the plurality of flash chambers is flashed into steam within the plurality of flash chambers, and the steam condenses on an external surface of the at least one conduit to form the condensed water for extraction.

These and other features of the present invention will become readily apparent upon further review of the following specification and drawings.

BRIEF DESCRIPTION OF THE DRAWINGS

The sole FIGURE is schematic diagram of a multi-stage flash desalination plant with a feed cooler according to the present invention.

DETAILED DESCRIPTION OF THE PREFERRED EMBODIMENTS

The present invention relates to a multi-stage flash desalination plant with a feed water cooler, designated generally as 10 in the drawing. In use, feed seawater or brine enters the system under pressure, being drawn into the plant 10 via a vacuum pump 28 or the like. In a conventional multi-stage flash desalination (MSF) system, the seawater or brine is transported directly, under pressure, through feed heater conduits or pipes 32 (via inlet 13) to a brine heater 14, after passing through outlet 15, which then delivers heated brine to flash chambers 16. A steam generator 12, which is a separate simple steam power plant, external to the MSF, supplies the brine heater with the heating steam needed to heat up the brine. The steam generator 12 is a simple steam power plant (preferably a Rankine cycle power plant), and consists of a pump 40, a boiler 42, and a steam turbine 44, in addition to the brine heater 14. Conventional MSF systems are well-known. U.S. Pat. Nos. 3,966,562 and 3,948,734, both of which are hereby incorporated by reference in their entirety, show conventional MSF systems.

In the MSF plant 10, the brine, however, is first drawn through a cooler 30 in order to reduce the temperature of the feed, thus also the temperature of the last stage. This results in increasing the evaporation range and, therefore, the amount of potable water produced. The cooler 30 may be a conventional refrigeration machine or the like operated utilizing a small part of the power H1, available from the power plant producing the heating steam (i.e., the steam generator 12). The brine is then passed directly to and through the feed heater conduits or pipes 32. The feed heaters 32 are condenser type heat exchangers where feed is heated by the heat released from condensing the vapor flashed off in each stage. Feed reaches the top stage at an elevated temperature, however it is not high enough to start flashing, and therefore, additional heat must be supplied to the brine. The heater 14 receives steam from the external steam generator 12, and elevates the brine temperature to the level suitable to start flashing. The brine is then injected into the flash chambers 16. It should be understood that the number of flash chambers 16 shown in the drawing is shown for exemplary purposes only, and is a simplification of the number of flash stages. Typical MSF plants have between fifteen and forty stages or chambers. The brine delivered by the heater 14 typically has a temperature of between approximately 90° C. and 120° C., depending upon the chemical treatment or scale prevention technique used, the quality of heating steam, and the ejection system maintaining pressure in each stage.

The operating pressure in the flash chambers 16 is lower than that in the heater, thus causing the heated brine to rapidly boil or "flash" into steam. Typically, only a small percentage of this water is converted into steam. Consequently, the remaining water will be sent through a series of additional stages or flash chambers 16, as shown, each possessing a lower operating pressure than the previous chamber. The brine is delivered through each successive flash chamber 16 or stage through any conventional method. As steam is generated, it is condensed on the pipes 32, which run through each chamber. The condensed water is then collected by collection trays 18 and is removed by a pump 20 to produce a stream of potable water 22. As in a conventional MSF plant, the pipes 32 and trays 18 form the condensers for each flash stage. The remaining brine with a high saline concentration may be drawn out by a separate pump 24, and removed as waste at 26.

The above distillation plant 10 may be paired with a power plant 12 in a cogeneration configuration. Waste heat from the power plant in such a configuration is used to heat the seawater, providing cooling for the power plant at the same time. This provides the power needed to operate the cooler in addition to the features of dual purpose plants.

In conventional MSF plants, water begins evaporation in the first stage at a temperature which is set by scale preventers and controlled brine heaters (condensors). Evaporation ends in the final stage, where temperature is controlled by the feed water temperature. The water cooler 30 of plant 10 reduces the temperature of the feed water before entering the bulk of the plant, thus decreasing the temperature of the final stage. This decrease in temperature increases the evaporation range (measured via the temperature difference between the intial and final stages), and eliminates the effect of seasonal climatic changes on the plant operation.

Increasing the evaporation range elongates the span along which evaporation takes place, thus increasing the volume of fresh, or distilled, water produced. The yield of potable water volume is increased, in comparison to a conventional MSF plant, by more than 1.7% for every 1° C. reduction in the feed water temperature (estimated for a plant having 30 stages or chambers, and a maximum brine temperature of 100° C.).

It is to be understood that the present invention is not limited to the embodiment described above, but encompasses any and all embodiments within the scope of the following claims.

I claim:

1. A once-through multi-stage flash desalination plant with feed cooler, comprising:
    a plurality of flash distillation stages, each of the flash distillation stages including a flash chamber;
    a condenser comprising at least one conduit having an inlet and an outlet, the at least one conduit passing through the plurality of flash chambers;
    means for extracting a volume of brine from an external source and feeding the volume of brine under pressure directly to and through the at least one conduit, the means being in fluid communication with the inlet of the at least one conduit;
    means for cooling the volume of brine prior to direct delivery thereof through the at least one conduit, wherein the cooling means includes a refrigeration system in direct fluid communication with the inlet of the at least one conduit;
    means for heating the volume of brine after the volume of brine has been delivered through the at least one conduit and prior to injection thereof into the flashing stage, wherein the heating means includes a heater in fluid communication with the outlet of the at least one conduit and a steam generator for infusing heated steam into the volume of brine after the volume of brine has been heated by the heater; and
    means for extracting condensed water;
    wherein the heated volume of brine injected into the plurality of flash chambers is flashed into steam within the plurality of flash chambers, and the steam condenses on an external surface of the at least one conduit to form the condensed water.

* * * * *